US006950206B1

(12) United States Patent
Kärsten et al.

(10) Patent No.: US 6,950,206 B1
(45) Date of Patent: Sep. 27, 2005

(54) METHOD AND APPARATUS FOR VERIFICATION OF IMPOSITIONS FOR PRINTING PLATES

(75) Inventors: Toivo Kärsten, Trångsund (SE); Jagdev Rehal, Järfälla (SE)

(73) Assignee: Somitrack AB, Jarfalla (SE)

( * ) Notice: Subject to any disclaimer, the term of this patent is extended or adjusted under 35 U.S.C. 154(b) by 0 days.

(21) Appl. No.: 09/807,606

(22) PCT Filed: Feb. 24, 1999

(86) PCT No.: PCT/SE99/00260

§ 371 (c)(1),
(2), (4) Date: Apr. 16, 2001

(87) PCT Pub. No.: WO00/23276

PCT Pub. Date: Apr. 27, 2000

(30) Foreign Application Priority Data

Oct. 21, 1998 (SE) .................................. 9803600

(51) Int. Cl.[7] .............................................. G06F 15/00

(52) U.S. Cl. .................. 358/1.18; 358/1.11; 358/1.15; 358/1.12

(58) Field of Search ............................ 358/1.18, 1.11, 358/1.15, 1, 12, 515; 347/104; 101/485

(56) References Cited

U.S. PATENT DOCUMENTS

| | | |
|---|---|---|
| 4,623,900 A | 11/1986 | Watanabe |
| 5,415,391 A | 5/1995 | Wong et al. |
| 5,625,766 A | 4/1997 | Kauffman |

FOREIGN PATENT DOCUMENTS

| | | |
|---|---|---|
| EP | 0 105 468 | 4/1984 |
| EP | 0 896 939 | 2/1999 |
| GB | 2 168 688 | 6/1986 |
| JP | 60-191943 | 9/1985 |
| JP | 6-219651 | 8/1994 |
| JP | 8-310706 | 11/1996 |
| WO | WO 98/42509 | 10/1998 |

OTHER PUBLICATIONS

Messerschmidt, Niels. "Ny roll for storformatskrivaren", Aktuel Grafisk Information, Oct. 10, 1997; Nr. 284, sid 28-30. ISSN 0347-9846.

*Primary Examiner*—Twyler Lamb
(74) *Attorney, Agent, or Firm*—Stites & Harbison PLLC; Douglas E. Jackson

(57) ABSTRACT

A method and an apparatus for performing a double sided imposition verification on sheets (7) of paper or another material of impositions (9) prepared by means of digital data (1, 2) and comprising several print pages consisting of text and/or images, and comprising a printing unit (3) in the form of a plotter/printer having a paper magazine (4) and means (5) for feeding one sheet (7) of paper at the time into the printing unit (3), means (17) for guiding said sheet (7) of paper into the printing unit (3) and for turning said sheet (7) of paper for making it possible to print said sheet of paper on both sides thereof, means (24) for observing the existence of sheets (7) of paper in the feeder unit, and means (25) for observing the front/rear edge of a sheet of paper, feeder and stop means (22, 23, 26<->14) for the sheet of paper, and means for turning the direction of rotation of the feeding-in and feeding-out means (22, 23) for sheets (7) of paper into and out from, respectively, said printing roll (14).

7 Claims, 3 Drawing Sheets

METHOD AND APPARATUS FOR VERIFICATION OF IMPOSITIONS FOR PRINTING PLATES

BACKGROUND OF THE INVENTION

Figure 1:
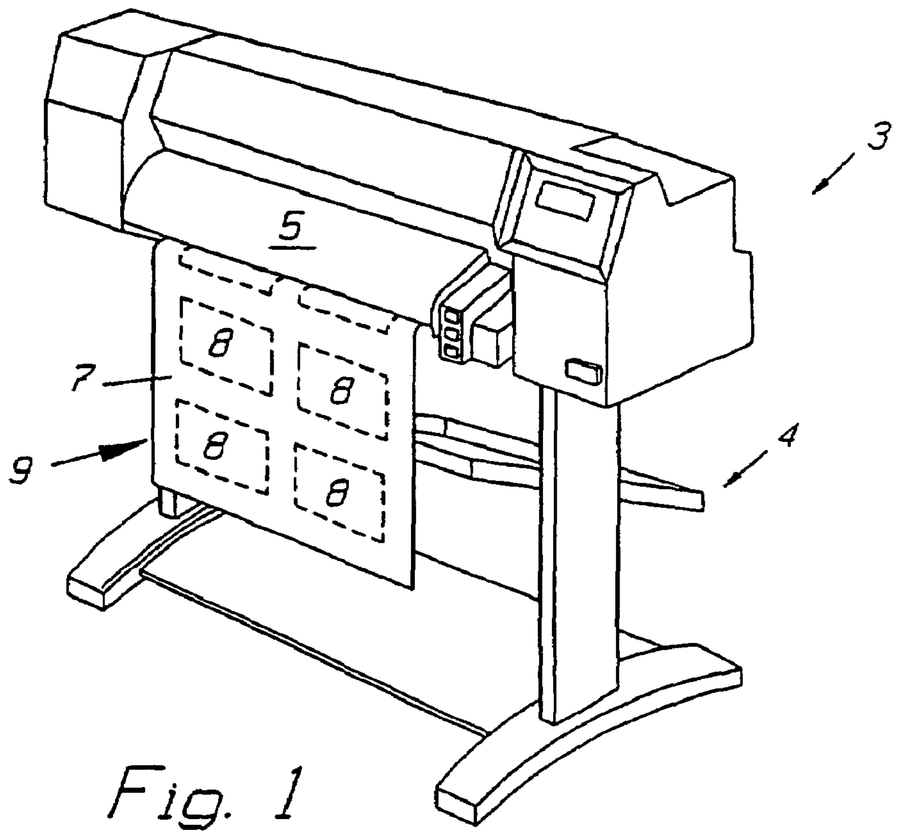

The present invention relates to a method and an apparatus intended to be used, in the first place, within the reproduction process area in the graphic industry, and more particularly for enhancing the possibility of preparing printing plates, for instance for offset printing, having correct impositions.

In planning the layout of magazines and books etc the pages must be placed in such an imposition that said pages, after folding of the printed page appear in a chronological order. As an assisting means for making the layout correct and the pages to follow each other in correct order a verification of the impositions is made.

Preparing "impositions" means that, for instance 8 pages (or 16, 32, 64 pages, etc) are placed in such order on the paper to be printed, which paper is of a predetermined size, that the pages, after the print paper has been folded, follow in a chronological order of page numbers, so that, in an 8 page print sheet, pages 1, 4, 5, 8 appear on the front side of the print sheet, and that pages 2, 3, 6 and 7 appear on the rear side of said print sheet.

PRIOR ART

In presently used methods for verifying the correctness of impositions it has been possible to check only one side of the print sheet. This is unsatisfactory since the rear side of the print sheet (the supplement side) is missing in the verification print out, and that there is consequently no possibility of checking that the impositions both for the front side and for rear side coincide with each other.

In conventional printing processes according to modern methods there are used computers for creating the print pages comprising text and images. A print page is what is seen in a book, a magazine, a catalogue, a newspaper etc. Digital data for said print pages are passed through several steps, which result in a so-called imposition. An imposition shows the position of each page of a printing sheet, generally comprising 8, 16, 32 or 64 print pages. The position of each side consisting of digital data is determined both considering the printing machine, for instance an offset printing press, an intaglio printing machine, or in some cases a letterpress printing machine by means of which the sheet is to be printed, and also by the method according to which the printed paper is folded after the printing step. Since the printing is made on both sides of the paper there is a need for two impositions. A first imposition contains data for printing of the front side of the print sheet and the second imposition contains data for printing of the rear side of the print sheet.

Previously the impositions used to be made on transparent films which were mounted such as to form a first imposition—for the front side—and a second imposition for the rear side. Said two impositions thereafter were exposed onto a first offset plate for the front side and a second offset plate for the rear side.

It is important that it is possible to verify that the pages of the impositions for the front side and the rear side, respectively, fall within the same area. For verifying that this is true it is possible to place the transparent films over each other and to visually check that said films have a mutual perfect register. Often there are used register marks, like hair crosses, which, at perfect register, have to be placed straight on top of each other, what is interpreted as a proof of perfect register between the impositions of the front side and the rear side, respectively, of the print sheet.

The work using films for the impositions is time consuming and expensive and requires several work moment which generally have to be performed in a dark room. Modern technics have made it possible to eliminate the need for film handling, and—instead thereof—to expose digital data directly from a computer onto the printing plate, generally by a laser heat print technics according to a method which is generally referred to a CTP technics (Computer To Plate), whereby the costs and the work involved in using transparent film handling processes are completely eliminated. By eliminating the need for use of films there have, however, appeared difficulties to verify or prove that the digital data for the impositions of the front side and the rear side, respectively, have obtained a perfect mutual register.

THE INVENTION

The invention is intended to solve the above mentioned problem by providing a quick and simple method of preparing a print sheet containing both a front side and a rear side. This is possible by using a type of printer or plotter which is formed to be able to print on both sides of a paper, generally using a rotary printing roll, over which the paper is moved in two steps, a first step whereby the printing is made on one side (front side) and a second step at which the paper is turned and the printing is made of the rear side of the paper.

Simple printing apparatus, for instance matrix plotters, are known in the art, which apparatus operate on rolls of paper, generally formed with guide bores along the edges of the path of paper. Said known apparatus generally have been formed so that it is possible to print only on one side of the paper.

Since also the printing is generally made on plane sheets of paper there has been a wish that the verification of the impositions for the front and rear sides can be made directly on plane sheets of paper, preferably the same type of paper, cut like the sheet of paper which is to be used in the printing machine. To this end the invention relates to a verification or proof print machine having a cassette in which the print papers are placed, and from which one paper at the time is lifted out and is introduced in the verification print machine, and more particularly in which the printing is made both of the front side and on the rear side of the print paper.

The impositions having a predetermined number of pages, each consisting of text and images, are made up as known in the art in a computer, and digital information from the computer is transferred to the printing unit in which the impositions are printed with an accurate positioning, controlled by information from the computer. When the printing of the first page, for instance the front side of the print sheet is ended a feeding in and feeding out unit of the printer/plotter takes over the print sheet and turns same and feeds it back into the printing unit. A printing is thereafter made on the rear side of the sheet of paper corresponding to the imposition for the rear side.

When the second (rear) side of the sheet of paper has been printed a double sided print sheet has been simulated. It is now possible to check the positioning of pages on both sides of the print sheet and the positioning of each separate page on the double page.

In this connection it should be mentioned that it is important that the print sheet from the paper cassette is introduced in the printing unit with the front edge of the paper exactly parallel to the axis of the printing unit and with the side edges of the print sheet exactly perpendicular to said axis. It may, however, happen that the print sheet is introduced slightly obliquely into the printing unit. If no correction of the position of the print sheet is made this may have as an effect that the impositions are printed at some angle to the front edge of the paper, and that the impositions thereby do not appear at exact mutual registers. It is therefore important that the sheet of paper is oriented so that the front edge and the rear edge of the paper are always arranged straight against a register edge of the printing apparatus.

For solving said problem the invention also is directed to a method and an apparatus for positioning the sheet of paper with the front edge and the rear edge thereof, respectively, exactly straight against a register edge of the verification printing machine.

A complete method for verifying the correctness of impositions for a front page and a rear page, respectively of a printing sheet is made as follows:

a) digital data comprising text and images are created in a computer,
b) whereby a verification machine for printing on both the front side and the rear side of a print sheet is used,
c) cut plane sheets to be printed are placed in a cassette, which is connected to the verification print machine,
d) digital data simulating the imposition for the front side is sent from the computer to the verification print machine,
e) a sheet to be printed is lifted out of the paper cassette and is fed, with the "front edge" thereof into the verification print machine,
f) the sheet to be printed is fed to an exact position, or is, upon need, rearranged to take an exact position and is introduced into the verification print machine via a feeding and turning unit,
g) digital data corresponding to the imposition of the front side are printed on the sheet of paper,
h) after said printing of the front side the print sheet is turned,
i) the print sheet is, with precision, fed, with the "rear edge" thereof to the printing machine, eventually after some adjustment of the position like in connection to the printing of the front side,
j) digital data corresponding the imposition of the rear side are transferred from the computer to the verification print machine,
k) the rear side of the sheet of paper is printed using digital data.

By now studying the impositions on the front side and the rear side of the printed sheet of paper, eventually after said sheet has been folded, it is possible to accurately verify that the impositions of the front side and rear side show a perfect mutual register.

For foreseeing that the sheet of paper comes to engagement with the front edge and the rear edge thereof, respectively, exactly against an engagement edge of the verification print machine, even if said sheets of paper should happen be introduced obliquely, it is made as follows:

- the sheet is fed (at small steps) in the direction towards the engagement edge of the verification print machine (FIG. 4A),
- the feeding is made by means of step feeding rolls from a position spaced from the front edge,
- so that the paper is buckled, which buckling may be greater or less at the left hand edge or at the right hand edge of the paper depending on the oblique positioning of the paper (FIG. 4B),
- the printing unit locks the front edge thus correctly positioned, for instance in that the print sheet is introduced a very slight distance into the printing unit (FIG. 4C),
- the step feeding rolls are released from contact with the sheet of paper, whereby said paper is given a possibility of being turned into a correct position, corresponding to the buckling of the paper,
- whereby the paper is pulled into the verification print machine and the paper is printed (FIG. 4D).

THE DRAWINGS

Figure 2:
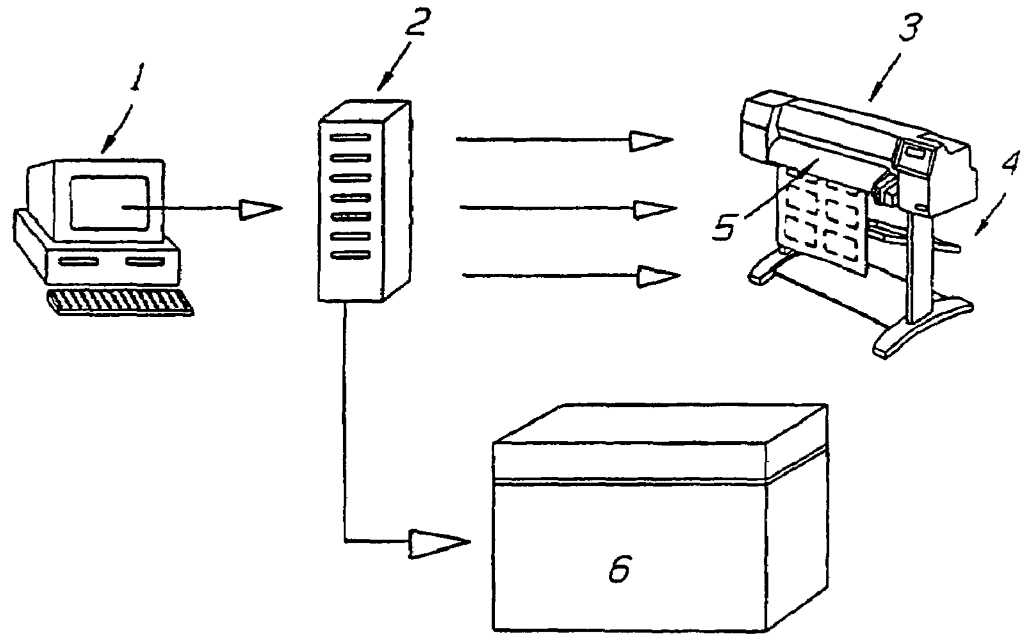
Figure 3:
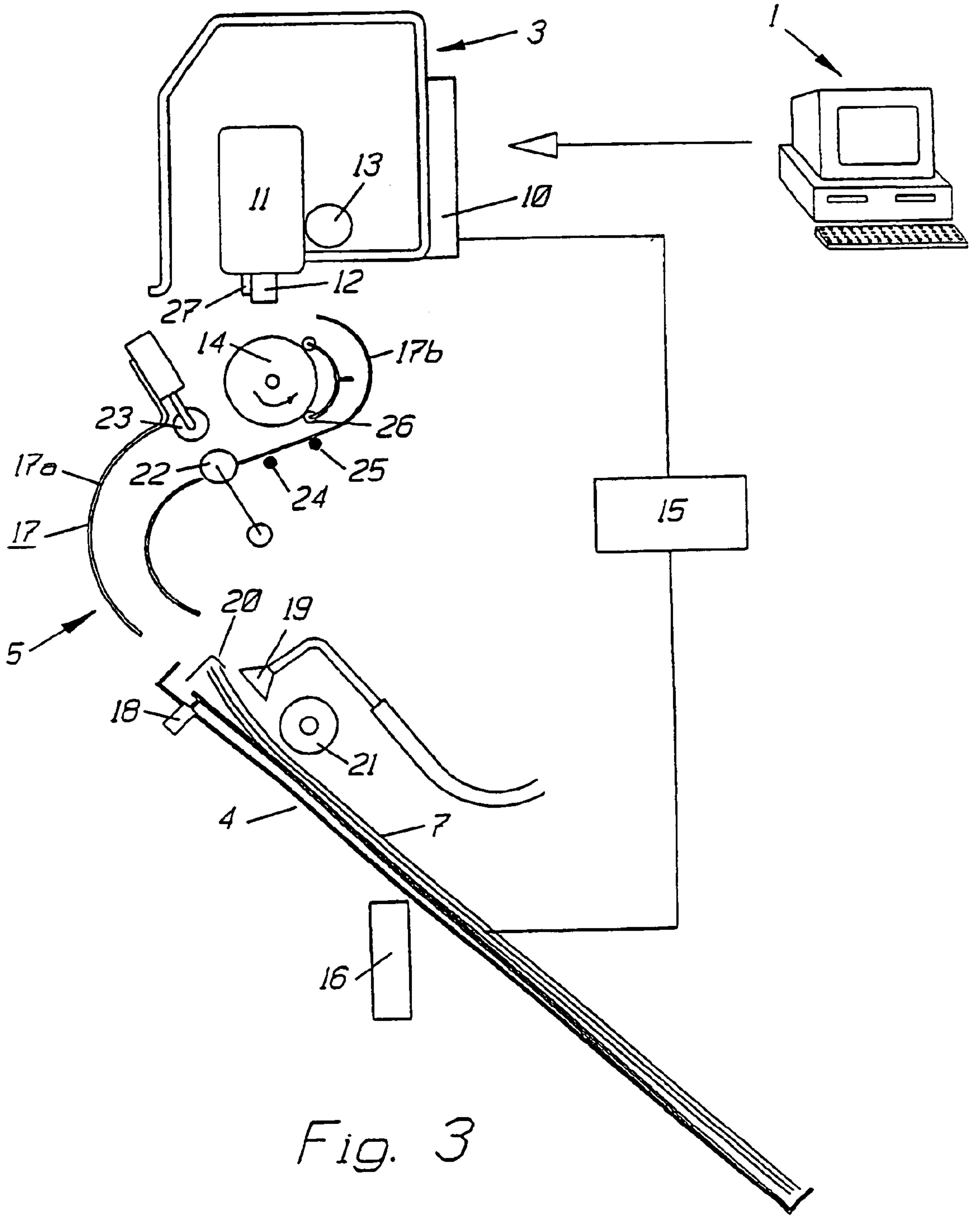
Figure 4:
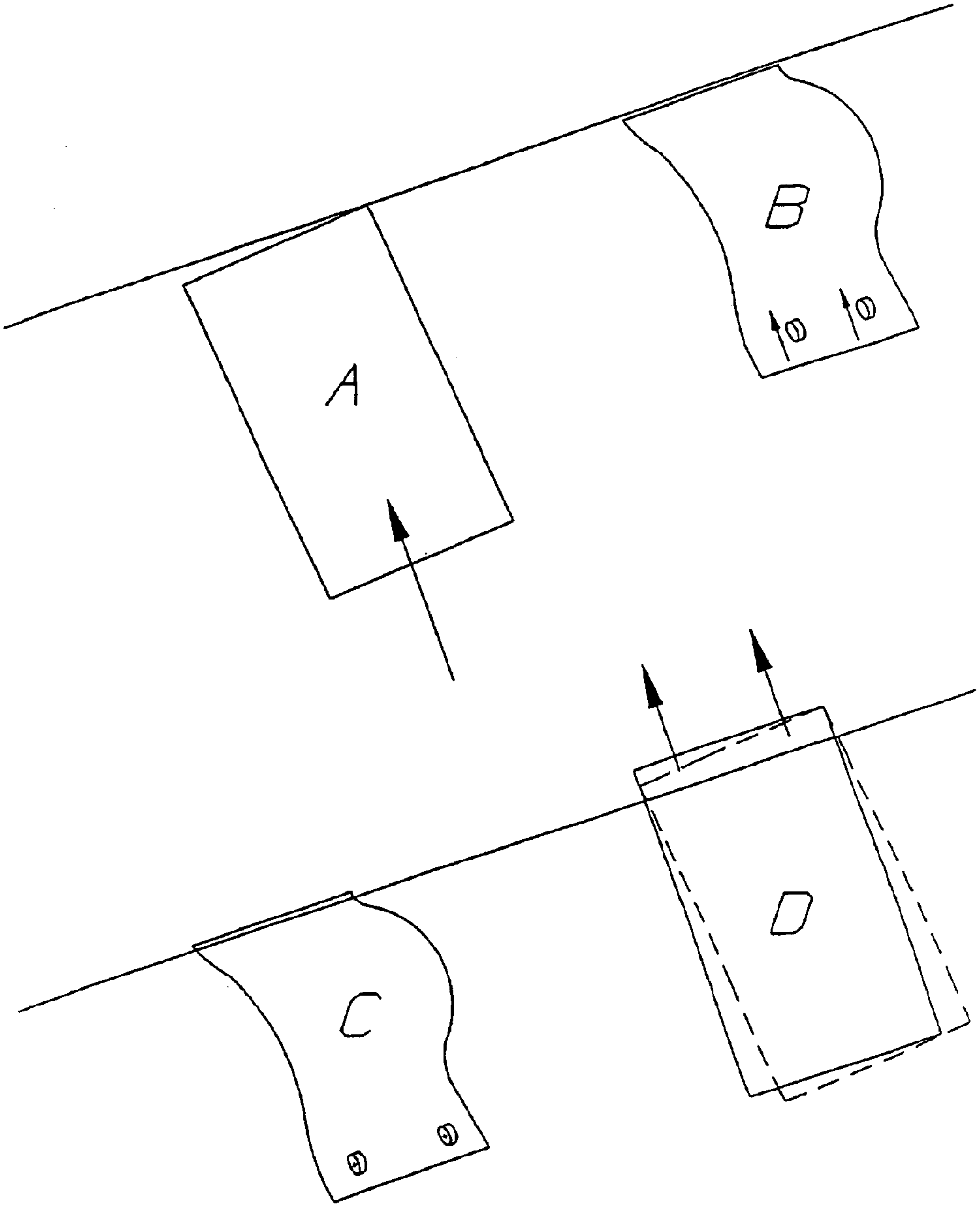

Now the invention is to be described more in detail with reference to the accompanying drawings, in which FIG. 1 is a perspective view of a verification or imposition proof machine according to the invention. FIG. 2 diagrammatically discloses the system for performing the method according to the invention. FIG. 3 diagrammatically, and in a vertical cross section view, shows an apparatus according to the invention, and illustrates the actual method. FIG. 4 shows in four different projections, A–D, the method and the apparatus for straightening up an obliquely introduced print paper.

DETAILED DESCRIPTION

As best evident from FIG. 2 a complete system for preparing a printing plate, using the invention, comprises a computer 1 having a viewing screen and a storing unit 2, a verification printer 3 with a paper sheet magazine 4 and a feeding and turning unit 5 for the sheets in the printer 3, and a unit 6 for finally making films and/or printing plates. The verification print system 3, 4, 5 provides a unit which is directly connected to the storing unit 2 of the computer 1, and also the plate making unit 6 is connected to the storing unit 2 of the computer 1.

The computer is formed for providing impositions, as known in the art, having a front side and a rear side thereby providing printing sheets, which impositions, according to the invention, can be verified by being printed onto a test print sheet 7 in the printer 3. Each imposition comprises several pages 8, for instance 4, 8, 16, 32 or 64 pages, each page comprising text and/or images, which pages 8 are positioned in an accurately determined pattern and in accurately determined locations in relation to each other so that the pages 8, after the printing sheet 7 has been folded will be located at exactly desired positions of the printing sheet. It is thereby important that the imposition 9 of the pages for the front side of the printing sheet is located in exact register with the imposition of the pages for the rear side of the printing sheet. It is for the verification thereof that the invention has been developed, even if the invention is useful also for other technical fields, especially within the graphic field.

As best evident from the diagrammatic illustration in FIG. 3 the printing part of the printer 3, which is known per se, comprises a control unit 10 which is connected at the rear side of the printer 3. At the front side the printer is formed with a carrier 11 for ink cartridges 12, for instance of ink jet type, preferably the four normal colours yellow, magenta, cyan and black for making 4-colour images. The ink cartridge carrier 11 is mounted on a horizontal lineary guide bar 13 on which the entire cartridge unit 12 is displaceable in two opposite directions while printing a sheet 7 of paper which is rotated stepwise past the ink cartridges 12 with the print paper supported on a printing roll 14. The printing of the colour or coulors from the cartridges 12 is controlled by the control unit 10 of the printer.

As soon as the guide unit 10 of the printer observes that data is coming from the computer 1, 2 a central guide unit 15 is activated, which guide unit, in turn, checks that there is paper 7 in the paper magazine or the cassette 4. In the illustrated case the cassette 4 is mounted at an angle of about 45°. The checking means for paper may be a sensor 16, which is mounted underneath the cassette 4. The cassette is mounted at the entrance of a guiding, feeding and turning unit 17 for a paper, which has been connected to the printer. For providing an feeding-in of the uppermost sheet 7 of paper in the cassette a solenoid 18 pushes the front edge of the cassette upwards so that said uppermost sheet 7 can be seized by suction cups 19 and can be lifted up to the upper side of down holding means 20, whereby a single sheet 7 is separated from the cassette. The solenoid 18 is thereafter de-activated, whereby the remaining sheets 7 of paper in the cassette fall back to the bottom of the cassette.

For feeding the separated sheet 7 into the printing unit feeder rolls 21 are actuated to introduce the sheet of paper into the feeder unit 17, in which the sheet is seized and moved forward by secondary drive rolls 22 and counter rolls 23 in the feeder unit co-operating therewith, so as to feed said sheet forward until a feeder/turning sensor 24 is activated. The feeder rolls 21 of the paper magazine/cassette are stopped, and the solenoid 18 is de-activated, whereby the bottom plate of the cassette falls back to the bottom of the cassette. The feeding and turning sensor 24 observes the presence of the sheet of paper, and the central unit 15 thereby brings the counter roll 23 to become lowered towards the secondary drive roll 22 which starts rotating in the clockwise direction, whereby the sheet 7 of paper is moved on along the lower guide plate 17*b* until said sheet 7 of paper reaches a second sensor, the media sensor 25, which is arranged to observe the front/rear edge of a sheet of paper and which is mounted at an introduction edge at the printing roll 14, which edge is formed by counter press rolls 26 engaging the printing roll 14, FIG. 4A. The front edge of the paper is thereby stopped whereas the feeder rolls 22 are stepped forwards, whereby the paper becomes buckled as indicated in FIG. 3B. The counter press rolls 26 which have so far been still standing in contact with the printing roll 14 now slowly begins to rotate together with the printing roll, so that the straightened up front edge of the sheet of paper is seized, is pulled in a little distance between the printing roll 14 and the counter press rolls 26 and is blocked by the printing unit, FIG. 4C. The feeder rolls 22, 23 are opened and the buckled paper is straightened up rearwardly from the front edge of the paper which is parallel to the axis of the printing roll 14, FIG. 4D. The buckling of the paper eliminates lack of lineary positioning of the front edge of the sheet of paper and foresees that said front edge extends parallelly to the axis of the printing roll 14.

The sheet of paper now is positioned with the front edge thereof exactly parallelly to the axis of the printing roll 14, and the printing is commenced in that the printing roll 14 starts rotating in the counter clockwise direction, as indicated with the arrow in FIG. 3, whereby the paper in pulled round the printing roll 14. The printing roll 14 now feeds the paper in the counter clockwise direction round said printing roll 14 guided by the guide plates 17 until the media sensor 25 is de-activated in that the rear edge of the sheet of paper reaches as far as to said media sensor 25.

The central control unit 15 counts the number of pulses, and the length of the sheet of paper is calculated by the control unit 10.

The control unit 10 now has full control over the positioning of the paper in the print position. In this position the front edge of the sheet of paper is about 25 mm displaced to the left of the ink cartridges 12. The ink cartridge carrier 11 is now moved transversally to the sheet of paper parallelly to the axis of the printing roll 14. A paper sensor 27, which is mounted on the ink cartridge carrier 11, 12 observes the parallellity of the side edges of the sheet of paper and the width of the paper. Said width of the sheet of paper is calculated by the control unit 10 of the printer 3.

Digital data from the computer 1, 2 corresponding to the imposition 9 of the front side is now printed on one side of the sheet 7. As soon as the media sensor 25 has been de-activated, what happens when the rear edge of the sheet passes the sensor 25 and digital data corresponding to the actual side are ready printed the central unit 15 instructs the counter rolls 23 to lower into contact with the secondary feeder rolls 22 and said feeder rolls 22 now start rotating in the counter clockwise direction, whereby the paper is pulled down in the part 17*a* of the turning unit until the rear edge of the paper has reached the turning sensor 24 for turning the sheet of paper. In this position the feeder rolls 22, 34 have held the paper secured thereby preventing same from becoming moved to an oblique position. Thereby the first side of the sheet of paper has been printed.

The printing of the second side (rear side) is started in that the central unit 15 now brings the secondary feeder rolls 22 to rotate in the clockwise direction in co-operation with the counter rolls 23, so that the sheet of paper is introduced against the upper guide plate 17*b* of the turning unit 17. The introduction is prosecuted so that the sheet of paper comes into contact with the feeding edge (26<->14) and becomes buckled in the same way as described above as concerns the front edge. The rear edge which is now facing upwards passes and activates the media sensor 25 and comes into engagement with the counter rolls 26. Said counter rolls 26 now once again start rotating slowly together with the printing roll 14, and the rear edge of the sheet of paper is introduced and is locked between the printing roll 14 and the counter press rolls 26. The secondary feeder rolls 22, 23 are opened and the paper is straightened up—if actual—so that the rear edge (now facing upwards) of the paper is parallel to the axis of the printing roll 14 and the paper 7 is straightened out. The printing roll 14 with the paper 7 is once again rotated in the counter clockwise direction and the paper is guided in the direction towards the lower guide plate 17*a* of the turning unit 17 until the media sensor 25 thereof is de-activated in that the end edge (formerly the front edge) of the sheet of paper passes the sensor 25. The central control unit 15 counts the number of pulses and the length of the paper is calculated by the control unit 10 of the printer.

The secondary feeder rolls 22 and counter rolls 23 are released from each other, and the printing roll 14 now is again rotated in the counter clockwise direction, and the paper is moved round said printing roll 14. Now the paper is, with the forwards facing edge located parallelly to the axis of the printing roll 14 and moved to a position underneath the ink cartridges 12.

The cartridge carrier 11 with the ink cartridges 12 mounted thereon move reciprocally on the lineary guide bar 13, parallelly to the axis of the printing roll 14. The paper sensor 27 on the cartridge carrier 11 observes the side edge parallellity of the sheet of paper and the width of the sheet. The size of said width of the paper is calculated by the control unit 10. The sheet now has been turned upside down, and therefore the rear side is located underneath and facing the printing unit 12. Digital data representing the imposition of said rear side now are fed from the computer 1, 2 to the printer 3. As soon as the media sensor 25 is de-activated, what happens when the rear edge of the sheet has passed the sensor 25 and after digital data corresponding to the actual side, the rear side, have been ready printed, the central unit 15 instructs the counter rolls 23 to be lowered into contact with the secondary feeder rolls 22, whereby the sheet of paper is seized. The feeder rolls now are rotated in the counter clockwise direction whereby the sheet of paper is fed downwards into the lower part 17*a* of the feeding unit 17. The counter rolls 23 are raised from the paper, and the paper slides out of said feeding unit 17 and drops down in a receiver. The sheet of paper now has been printed on both sides, and it is easy to verify that the impositions are correct both at the front side and at the rear side, and that the impositions for the front and rear sides are in correct register with each other. If this should not be the case a correction is made in the computer, and a renewed imposition verification is made as described above.

Even in the invention is described above mainly as concerns verification of impositions on a printing sheet in the graphic industry it is obvious that the invention is useful in other technical fields, especially for introducing flexible sheets of material in exact positions in a processing machine, whereby there is used a buckling of said flexible sheet for automatically direct the sheet into a correct position in the machine.

REFERENCE NUMERALS

1 computer
2 storing unit
3 verification printer
4 sheet magazine
5 feeding/turning mechanism
6 plate/film processor
7 printing sheet
8 side
9 imposition
10 control unit
11 carrier
12 ink cartridge
13 bar
14 printing roll
15 central control unit
16 paper sheet sensor
17 feeding/turning unit
18 solenoid
19 suction cup
20 down holding means
21 feeder roll for magazine
22 secondary feeder roll
23 counter roll
24 sensor for turning media
25 media sensor front/rear edge
26 counter press roll
27 paper sensor (on carrier 11)

What is claimed is:

1. A method for performing an imposition verification on sheets of paper or another material of impositions prepared by means of digital data and comprising several print pages consisting of text and/or images using a printing unit) in the form or a plotter/printer having a magazine for paper or another sheet formed material and means feeding one sheet of paper at the time into the printing unit, whereby a test print sheet is introduced through a feeding/turning unit of the printing unit and is printed on one side of the sheet based on digital information which has been received in a control unit of the printing unit, and the sheet of paper is turned upside down after the first page has been printed and the sheet is printed on the opposite side thereof based on digital information which has been received in the control unit or said printing unit, and a visual or another verification is made to determine that the print pages of the impositions for the two print sides are located exactly as determined and that the impositions of the front and rear sides of the print sheet exactly coincide with each other, and, in case any lack of exactness is observed, corrections are made in the computer unit for preparing text and/or images, whereupon a renewed verification printing is made as mentioned above, characterized in that in that the sheet of paper is fed, with the front edge thereof, to a position against a stop edge at the printing unit, in that the sheet of paper, from a place spaced rearwardly from said front edge is moved inwards a further little distance by means of secondary feeder rolls, whereby the sheet of paper becomes buckled and the front edge of the paper is straightened up, whereupon the feeding of the sheet of paper is stopped, the printing roll and the counter press rolls are rotated slowly so that the front edge of the sheet, which is now straightened up, is pulled forwards and is kept secured by the printing roll and the counter press rolls of the printing unit, and the rear (secondary) feeder rolls are released so that the sheet of paper is given the possibility, in case said sheet happens to be positioned obliquely, of being rotated and being straightened out to enter an exactly correct position.

2. A method according to claim 1, characterized in that the verification printing is made with the sheet of paper supported on a rotary printing roll, in that the printing of the first side (the front side) of the sheet of paper is made with the printing roll rotating in a predetermined direction (counter clockwise direction as seen in FIG. 3), whereupon the sheet of paper is turned and the opposite side (the rear side) of the sheet of paper is printed in that the printing roll is rotated in the same direction as in the said first direction with the sheet of paper turned upside down so that said opposite side (the rear side) of the sheet of paper is facing the printing unit.

3. A method according to claim 1, characterized in that the turning of the sheet of paper is made in that said sheet of paper is kept secured during the printing of the first side of the sheet by the secondary feeder rolls, in that the rotation direction of said secondary feeder rolls is reversed, and in that the sheet of paper is moved on, the front edge, upon need, is adjusted, and the sheet of paper is printed in the same way as the first side thereof was printed.

4. An apparatus for executing the method according to claim 1, comprising means for preparing impositions in digital form comprising several print pages each containing text and/or images, a printing unit for printing of sheets of paper, a magazine for plane sheets of paper, a feeder unit for feeding sheets of paper from said magazine to a printing unit, characterized in that the feeder unit is formed as a combined feeder and turning unit for sheets of paper comprising guide plates for the sheet of paper, stop means arranged adjacent a printing roll of the printing unit, secondary feeder rolls in the feeding unit mounted spaced from said stop means and arranged so that they can be rotated in two opposite directions, so that they can be stopped in a locking position for the sheet of paper, and so that they can be opened for releasing of the sheet of paper or parts thereof.

5. An apparatus according to claim 4, characterized in that the turning unit for sheets of paper comprises means for providing a stop edge for the sheet of paper and for providing a) a driving of secondary drive rolls and counter rolls cooperating therewith, b) a stopping of said drive rolls with the counter rolls pressed into contact with the drive rolls, and c) a releasing of said counter rolls from the secondary drive rolls.

6. An apparatus according to claim 4, characterized in that the stop edge for the sheet of paper comprises one or more counter press rolls arranged for being pressed into contact with a printing roll of the printing unit and, at still standing printing roll, to form a stop edge for straightening up the sheet of paper.

7. An apparatus according to claim 4, characterized in that the feeder unit is formed with a sensor for indicating the existence of a sheet of paper while feeding in such paper and turning same.

* * * * *